UNITED STATES PATENT OFFICE 2,723,192
Patented Nov. 8, 1955

2,723,192

HERBICIDAL PROCESS AND PRODUCT

Charles W. Todd, Westtown, Pa., assignor to E. I. du Pont de Nemours and Company, Wilmington, Del., a corporation of Delaware No Drawing. Application February 23, 1954,
Serial No. 412,044

10 Claims. (Cl. 71—2.6)

This invention relates to heribicidal compositions and methods employing phenyl alkenyl ureas as essential active ingredients.

The phenyl alkenyl ureas employed in the compositions and methods of the invention are represented by the following formula:

(1) 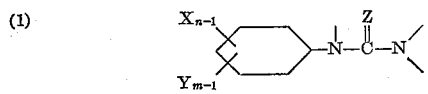

where X is halogen, Y is R or OR, where R is an alkyl radical of 1 to 5 carbon atoms inclusive, $n$ and $m$ are integers from 1 to 4 inclusive, with the proviso that the sum of $n$ and $m$ is less than 7, Z is oxygen or sulphur, and at least one of the nitrogen valence bonds is attached to a monovalent unsaturated hydrocarbon radical of 3 to 5 carbon atoms inclusive, and the remaining nitrogen valence bonds are attached to hydrogen or a monovalent aliphatic radical of 1 to 5 carbon atoms inclusive.

The phenyl alkenyl ureas can be prepared by conventional methods, for example, by reaction of aliphatic and aromatic primary and secondary amines with an isocyanate, isothiocyanate, carbamyl chloride, or thiocarbamyl chloride.

The following equations illustrate various methods with respect to the preparation of illustrative compounds:

(2) 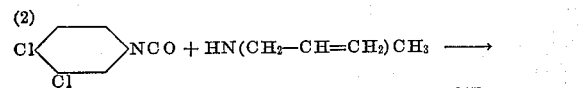

(3) 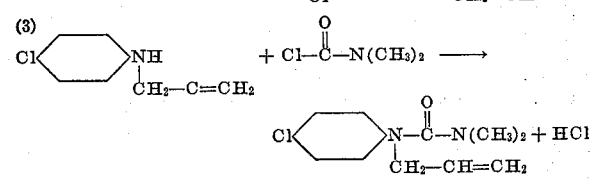

(4) 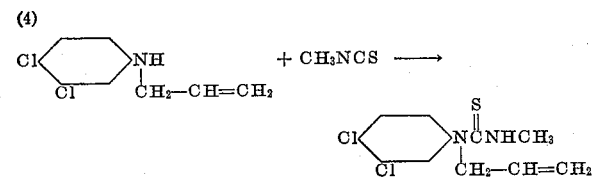

and (5) 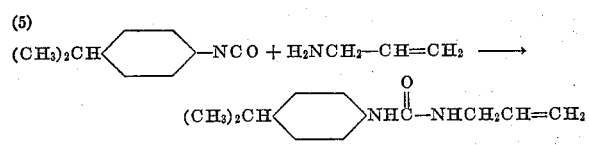

The above reactions are accomplished by bringing the amine in contact with one or the other of the reactants specified, usually in chemically equivalent amounts and, if necessary, heating to reaction temperature. It is, in many cases, preferable to use an excess of the amine, for example, 10–20% molar excess.

Altho not, in general, essential, inert liquid media, for example, dry benzene, dry toluene, dry dioxane, and the like can for the most part be advantageously employed in the methods outlined above. In employing the method illustrated by Equation 3 above, it is of advantage to use an acid acceptor, for example, a tertiary amine such as triethylamine, dimethylaniline, pyridine, and the like. Ordinarily, temperatures in the range of 0 to 100° C., or preferably 15 to 75° C., are satisfactorily employed for the above reactions.

Illustrative of the phenyl alkenyl ureas employed in the herbicidal compositions and methods of the invention are:

1. 3-(p-chlorophenyl)-1-methyl-1-(2,3-butadienyl)urea
2. 3-(3,4-dichlorophenyl)-1-allyl-1-methylurea
3. 1-(p-tolyl)-3-allyl-thiourea
4. 1-(phenyl)-1-methyl-3-allyl thiourea
5. 3-(p-chlorophenyl)-3-methyl-1,1-diallythiourea
6. 3-(p-chlorophenyl)-3-methyl-1,1-diallylthiourea
7. 3-(o-tolyl)-1-allylthiourea
8. 3-(m-tolyl)-1-allylthiourea
9. 3-(o-methoxyphenyl)-1-allylthiourea
10. 3-phenyl-1-(2-methylallyl)-thiourea
11. 3-(4-chloro-o-tolyl)-1-allylthiourea
12. 3-(p-phenetyl)-1-allylthiourea
13. 3-(p-chlorophenyl)-1-allylurea
14. 1-phenyl-1-allyl-3-methylurea
15. 3-(p-methoxyphenyl)-1-allylthiourea
16. 1-(p-methoxyphenyl)-1-(2-methylallyl)-3-methylurea
17. 1-(p-chlorophenyl)-1-(2-methylallyl)-3-methylurea
18. 3-(p-methoxyphenyl)-1,1-diallylurea
19. 1-(p-chlorophenyl)-1-allyl-3-ethylurea
20. 1-(p-chlorophenyl)-1-allyl-3,3-dimethylurea
21. 3-(3,4-dichlorophenyl)-1-allylthiourea
22. 3-(p-chlorophenyl)-1-allylthiourea
23. 1-phenyl-1-allyl-3,3-dimethylurea
24. 1-(3,4-(dichlorophenyl)-1-allyl-3,3-dimethylurea
25. 1-(3-chloro-p-tolyl)-1-allyl-3,3-dimethylurea
26. 1-(p-isopropylphenyl)-1-allyl-3,3-dimethylurea
27. 1-(p-chlorophenyl)-1-allyl-3,3-diethylurea
28. 1-phenyl-1-allyl-3,3-dibutylurea
29. 1-(3,4-dichlorophenyl)-1-allyl-3-methylurea
30. 1-(3,4-dichlorophenyl)-1-allyl-3-propylurea
31. 3-(3,4-dichlorophenyl)-1-allylurea
32. 3-(p-chlorophenyl)-1-allyl-1-methylurea
33. 3-phenyl-1-allyl-1-methylurea
34. 3-(p-ethylphenyl)-1-allyl-1-methylurea
35. 3-(p-tolyl)-1-allyl-1-methylurea
36. 3-(3-chloro-p-tolyl)-1-allyl-1-methylurea
37. 3-(p-bromophenyl)-1-allyl-1-methylurea
38. 3-(p-iodophenyl)-1-allyl-1-methylurea
39. 3-(p-fluorophenyl)-1-allyl-1-methylurea
40. 3-(2,4,5-trichlorophenyl)-1-allyl-1-methylurea
41. 3-(3,4-dichlorophenyl)-1-allyl-1-ethylurea
42. 1-(3,4-dichlorophenyl)-1-methyl-3-allylurea
43. 1-(3,4-dichlorophenyl)-1-ethyl-3-allylurea
44. 1-(p-chlorophenyl)-1-propyl-3-allylurea
45. 1-(3,4-dichlorophenyl)-3-allyl-1,3-dimethylurea
46. 1-(p-chlorophenyl)-3-allyl-1,3-dimethylurea
47. 3-(3,4-dichlorophenyl)-3-methyl-1,1-diallylurea
48. 3-(3,4-dichlorophenyl)-1,1-diallylurea
49. 3-(3-chloro-4-methoxyphenyl)-1-allyl-1-methylurea
50. 1-(3-chloro-p-tolyl)-3-allyl-1,3-dimethylurea
51. 1-(3,4-dichlorophenyl)-1,3-diallylurea
52. 1-(p-chlorophenyl-1,3-diallylurea
53. 1-phenyl-1,3-diallylurea
54. 1-(3,4-dichlorophenyl)-1,3-diallylurea-3-methylurea
55. 1-(3,4-dichlorophenyl)-1,3,3-triallylurea
56. 1-(p-chlorophenyl)-1,3,3-triallylurea 57. 1-(3,4-dichlorophenyl)-1-butyl-3-allylurea
58. 3-(3-chloro-4-sec.butylphenyl)-1-allyl-1-methylurea
59. 3-(4-isopropylphenyl)-1-allyl-1-methylurea
60. 3-(3-chloro-4-isopropoxyphenyl)-1-allyl-1-methylurea
61. 1-(p-chlorophenyl)-1-butyl-1-allylurea
62. 3-(3-chloro-4-ethylphenyl)-1-allyl-1-methylurea
63. 3 - (3,4 - dichlorophenyl) - 1 - (2 - methylallyl) - 1 - methylurea
64. 1-(3,4-dichlorophenyl)-1-(2-butenyl)-3-methylurea
65. 3-(3,4-dimethylphenyl)-1-allyl-1-methylurea
66. 3-(2,4,5-trimethylphenyl)-1-allyl-1-methylurea The phenyl alkenyl ureas which are especially more attractive from a practical standpoint are those responding to the formula:

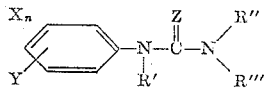

or

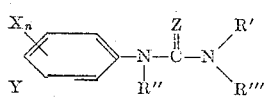

where X is hydrogen or chlorine and most preferably chlorine, Y is hydrogen or alkyl of 1 to 5 carbon atoms, i. e., methyl, ethyl, propyl, butyl, and amyl and the isomeric forms of the propyl, butyl and amyl radicals, $n$ is an integer from 1 to 3 inclusive, Z is oxygen or sulfur, R' is allyl, R'' is methyl, ethyl, propyl, or isopropyl, and R''' is hydrogen or methyl.

The herbicidal compositions of the invention are prepared by admixing one or more of the phenyl alkenyl ureas defined heretofore, in herbicidally effective amounts, with a conditioning agent of the kind used and referred to in the art as a pest control adjuvant or modifier in order to provide formulations adapted for ready and efficient application to soil or weeds (i. e., unwanted plants) using conventional applicator equipment.

Thus the herbicidal compositions, or formulations, are prepared in the form of either powdered solids or liquids. The liquid compositions, whether solutions or dispersions of the active substituted urea in a liquid diluent, contain as a conditioning agent a surface-active dispersing agent in amounts sufficient to render the liquid composition readily dispersible in water for application as an aqueous spray. The powdered solid herbicidal compositions preferably also contain a surface-active dispersing agent in amount sufficient to impart water dispersibility to the powdered compositions, altho the surface-active dispersing agent can be omitted if it is desired to apply the compositions by dusting rather than spraying. However, even tho the surface-active dispersing agent be omitted in the latter event, the herbicidal compositions will still contain, of course, a powdered solid carrier or diluent as a conditioning agent.

The surface-active dispersing agents employed in the herbicidal compositions of the invention are sometimes referred to in the art as wetting, dispersing, or penetrating agents. They are agents which cause the compositions, whether in liquid or powdered solid form, to be easily dispersed in water to give aqueous sprays. They can be of the anionic, cationic, or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

Powdered or dust compositions of the invention whether or not also modified with a surface-active dispersing agent to make them water dispersible are prepared by admixing one or more of the active substituted ureas with finely divided solids, preferably, talcs, natural clays, pyrophyllite, diatomaceous earth, and flours such as walnut shell, wheat, redwood, soya bean, and cottonseed flours. Other inert solid carriers which can be used to prepare the herbicidal formulations include magnesium and calcium carbonates, calcium phosphate, sulfur, lime, etc. either in powder or granular form. The percentage by weight of the essential active ingredients will vary according to the manner in which the composition is to be applied but, in general, will be 0.5 to 95% by weight of the herbicidal composition.

The active substituted ureas can be dissolved in organic solvents such as cyclohexanol, furfural, acetone, isobutanol, ethanol, isopropylacetate, and the like in the preparation of liquid compositions of the invention. Concentrated water-dispersible liquid compositions can be prepared by incorporating the ureas and surface-active dispersing agents in various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active dispersing agent to urea can be 0.1 to 100% by weight in the water-dispersible herbicidal compositions.

The herbicidal compositions of the invention can also have incorporated therein oils, fats, or similar vehicles such as cottonseed oil, olive oil, lard, paraffin oil, hydrogenated vegetable oils, etc. Adhesives such as gelatin, blood albumin, resins, for example, rosin, alkyd resins and the like, can also be used in certain compositions to increase retention or tenacity of deposits following application.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment on ponds and lake bottoms, it will be convenient to use a pellet form of the composition.

In another method of application for weed control, the ureas are incorporated with fertilizers to form either powdery or granular herbicidal compositions that can be used in the cultivation of agricultural crops.

The active ingredients are, of course, applied in amount sufficient to exert the desired herbicidal action. The amount of herbicidally active compounds present in the compositions as actually applied for destroying or preventing weeds will vary with the herbicidal activity of the active ingredients, the purpose for which the application is being made (i. e. whether for short term or long term control), the manner of application, the particular weeds for which control is sought, and like variables. Certain of the specific examples to follow will illustrate various kinds and amounts of application and the results obtained thereby. In general, the herbicidal compositions as applied in the form of a spray or a dust will contain from about 0.02% to 95% by weight of herbicidally active ingredients.

The solid and liquid compositions described and employed herein for application of the essential active herbicidal ingredients all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

In order that the invention may be better understood, the following examples are given in addition to the examples already given above. The examples illustrate typical herbicidal compositions of the invention, methods for their preparation, herbicidal applications, and the results obtained. The numbers following the tabulated ingredients represent parts by weight of the ingredients in the respective compositions.

EXAMPLE 1

A total of 40.5 parts by weight of 3,4-dichloroaniline dissolved in 150 parts by weight of xylene was added dropwise to a stirring solution of 27 parts by weight of phosgene contained in 150 parts by weight of xylene solvent at reflux temperature. A clear solution of the corresponding 3,4-dichlorophenyl isocyanate was obtained by heating these reagents until hydrogen chloride ceased to evolve from the reaction.

The isocyanate solution was cooled and combined slowly with 27 parts by weight of N-methyl allylamine with stirring (under anhydrous conditions). To insure complete interaction, the reaction was heated at reflux temperature for a period of one hour. Upon cooling, a total of 56 parts by weight of essentially pure 3-(3,4-dichlorophenyl)-1-allyl - 1 - methylurea crystallized out of solution as white needles melting at 103.5–105° C. A portion recrystallized from toluene gave a white solid melting point of 105° C. to 106.5° C.

Analysis:
    Calc'd for $C_{11}H_{12}Cl_2N_2O$ _____ N, 10.82; Cl, 27.42
    Found _____ N, 10.89; Cl, 26.80
                                            11.12; 27.21

The herbicidal properties of the phenyl alkenyl ureas are illustrated by the results obtained from application of aqueous sprays containing as the active ingredient the compound prepared as described above in this example. Tomato plants used as indicators of herbicidal activity were killed when observed four weeks after application thereto of a spray containing only 0.5% of the phenyl alkenyl urea. Quack grass and Johnson grass foliage treated with the phenyl alkenyl urea were killed. In these latter tests, the composition applied to the quack grass contained 1% by weight of the phenyl alkenyl urea and the observation was made three months after treatment. In the Johnson grass tests, a 3% composition was applied and the observation of results was made four weeks after treatment.

EXAMPLE 2

A total of 10.3 parts by weight of allylamine was added slowly to 23 parts by weight of p-chlorophenyl isocyanate contained in 300 parts by weight of ethyl acetate. This mixture was heated at reflux temperature for a period of 0.5 hours. Upon cooling, 28.5 parts by weight of essentially pure 3-(p-chlorophenyl)-1-allylurea crystallized out of solution melting at 185–186° C.

Analysis:
    Calc'd for $C_{10}H_{11}ClN_2O$ _____ Cl, 16.9
    Found _____ Cl, 16.82
                                                  16.76

The compound prepared as above was found to kill tomato plants when applied in an aqueous dispersion containing 1% of the phenyl alkenyl urea and to kill foliage of quack grass to which it was applied in a concentration of 3% of the phenyl alkenyl urea.

EXAMPLE 3

*Water-dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---:|
| 3 - (3,4 - dichlorophenyl) - 1 - allyl - 1 - methylurea | 75 |
| Fuller's earth | 23.75 |
| Sodium lauryl sulfate, 50% (wetting agent) | 1 |
| Methyl cellulose, 15 cps. (dispersing agent) | .25 |
| | 100.00 |

B

| | |
|---|---:|
| 3 - (p - chlorophenyl) - 1 - allyl - 1 - methylurea | 80 |
| Sodium disulfonate of dibutyl phenylphenol (wetting and dispersing agent) | 2 |
| Bentonite | 18 |
| | 100 |

EXAMPLE 4

*Dust formulations*

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---:|
| 3 - (p - chlorophenyl) - 1 - allylurea | 20 |
| Talc | 80 |
| | 100 |

B

| | |
|---|---:|
| 1 - phenyl - 1 - methyl - 3 - allylthiourea | 5 |
| Cottonseed oil | 4 |
| Walnut shell flour | 91 |
| | 100 |

EXAMPLE 5

*Oil-water dispersible powders*

The following powdered compositions are adapted for use in the preparation of spray compositions using either an oil, water, or a combination of oil and water as the liquid diluent. The powders are made by mixing and grinding as in the case of the powders of Example 4.

A

| | |
|---|---:|
| 1 - (3,4 - dichlorophenyl) - 1 - allyl - 3,3 - dimethylurea | 70 |
| Alkylated aryl polyether alcohol (wetting and dispersing agent) | 4 |
| Fuller's earth | 26 |
| | 100 |

B

| | |
|---|---:|
| 1 - (p - chlorophenyl) - 3 - allyl - 1,3 - dimethylurea | 80 |
| Ethylene oxide stearate-laurate (emulsifying agent) | 4 |
| Pyrophyllite | 16 |
| | 100 |

EXAMPLE 6

*Water-dispersible liquid compositions*

The following compositions are in a liquid form and are adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compounds and conditioning agent or agents in an organic liquid diluent.

A

| | |
|---|---:|
| 3 - (2,4,5 - trichlorophenyl) - 1 - allyl - 1 - methylurea | 25 |
| Long chain fatty alcohol sulfate (emulsifying agent) | 2 |
| Goulac (dispersing agent) | 3 |
| Kerosene | 70 |
| | 100 |

B

| | |
|---|---:|
| 3 - (p - chlorophenyl) - 1 - methyl - 1 - (2,3 - butadienyl) urea | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 7

*Granular compositions*

The following compositions are adapted for application by means of a fertilizer spreader apparatus or similar equipment. The compositions are readily prepared by mixing the ingredients with water to form a paste. The paste is then extruded, dried, and ground to give the desired granular size. Preferably, the granules will be in the order of one-thirty second to one-quarter inch diameter.

A

| | |
|---|---:|
| 1-(3,4-dichlorophenyl-1-allyl-3-methylurea | 10 |
| Goulac (dispersing agent) | 3 |
| Hydrocarbon oil | 1 |
| Dextrin (binding agent) | 20 |
| Fuller's earth | 66 |
| | 100 |

B

| | |
|---|---:|
| 1-(p-chlorophenyl)-1-allyl-3,3-dimethylurea | 7 |
| Goulac | 3 |
| Refined kerosene | 1 |
| Gelatin | 25 |
| Talc | 64 |
| | 100 |

This application is a continuation-in-part of my copending application Serial No. 186,118, filed September 21, 1950, now abandoned.

Those skilled in the art will appreciate that other phenyl alkenyl ureas in addition to those specifically named above can be prepared and employed in the compositions and methods of the invention. Thus the foregoing detailed description has been given for clearness of understanding only and no unnecessary limitations are to be understood therefrom.

I claim:

1. A method for the control of weeds which comprises applying to a locus to be protected, in amount sufficient to exert a herbicidal action, a phenyl alkenyl urea represented by the formula (1)

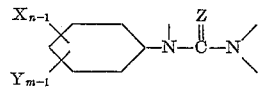

where X is halogen; Y is selected from the group consisting of R, and OR where R in said R and OR is an alkyl radical of 1 to 5 carbon atoms inclusive; $n$ and $m$ are integers from 1 to 4 inclusive, with the proviso that the sum of $n$ and $m$ be less than 7; Z is oxygen; and at least one of the nitrogen valence bonds is attached to a saturated carbon atom of a monovalent unsaturated hydrocarbon radical of 3 to 5 carbon atoms inclusive and the remaining nitrogen valence bonds are attached to a member selected from the group consisting of hydrogen and monovalent aliphatic radicals of 1 to 5 carbon atoms inclusive.

2. A herbicidal composition comprising a surface-active dispersing agent and in amount sufficient to exert herbicidal action a phenyl alkenyl urea represented by the formula

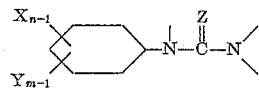

where X is halogen; Y is selected from the group consisting of R, and OR where R in said R and OR is an alkyl radical of 1 to 5 carbon atoms inclusive, $n$ and $m$ are integers from 1 to 4 inclusive, with the proviso that the sum of $n$ and $m$ be less than 7; Z is oxygen; and at least one of the nitrogen valence bonds is attached to a saturated carbon atom of a monovalent unsaturated hydrocarbon radical of 3 to 5 carbon atoms inclusive and the remaining nitrogen valence bonds are attached to a member selected from the group consisting of hydrogen and monovalent aliphatic radicals of 1 to 5 carbon atoms inclusive.

3. A herbicidal composition comprising a surface-active dispersing agent and, in amount sufficient to exert herbicidal action, 3-(3,4-dichlorophenyl)-1-allyl-1-methylurea.

4. A herbicidal composition comprising a surface-active dispersing agent and, in amount sufficient to exert herbicidal action, 1-(3,4-dichlorophenyl)-1-allyl-3,3-dimethylurea.

5. A herbicidal composition comprising a surface-active dispersing agent and, in amount sufficient to exert herbicidal action, 3-phenyl-1-allyl-1-methylurea.

6. A herbicidal composition comprising a surface-active dispersing agent and, in amount sufficient to exert herbicidal action, 1-(p-chlorophenyl)-3-allyl-1,3-dimethylurea.

7. A method for the control of weeds which comprises applying to a locus to be protected, in amount sufficient to exert herbicidal action, 3(3,4-dichlorophenyl)-1-allyl-1-methylurea.

8. A method for the control of weeds which comprises applying to a locus to be protected, in amount sufficient to exert herbicidal action, 1-(3,4-dichlorophenyl)-1-allyl-3,3-dimethylurea.

9. A method for the control of weeds which comprises applying to a locus to be protected, in amount sufficient to exert herbicidal action, 3-phenyl-1-allyl-1-methylurea.

10. A method for the control of weeds which comprises applying to a locus to be protected, in amount sufficient to exert herbicidal action, 1-(p-chlorophenyl)-3-allyl-1,3-dimethylurea.

References Cited in the file of this patent

Beilstein's "Handbuch der Organischen Chemie," 4th edition (1929), vol. 12, page 350.